US012171714B2

(12) United States Patent
Koth

(10) Patent No.: US 12,171,714 B2
(45) Date of Patent: Dec. 24, 2024

(54) PRESSURE RELEASE AND MASSAGE TOOL

(71) Applicant: Aletha Inc., Walnut Creek, CA (US)

(72) Inventor: Christine Annette Koth, Walnut Creek, CA (US)

(73) Assignee: ALETHA INC., Walnut Creek, CA (US)

( * ) Notice: Subject to any disclaimer, the term of this patent is extended or adjusted under 35 U.S.C. 154(b) by 0 days.

(21) Appl. No.: 18/396,650

(22) Filed: Dec. 26, 2023

(65) Prior Publication Data

US 2024/0122802 A1 Apr. 18, 2024

Related U.S. Application Data

(63) Continuation of application No. 18/300,772, filed on Apr. 14, 2023.

(60) Provisional application No. 63/363,085, filed on Apr. 15, 2022.

(51) Int. Cl.
*A61H 39/04* (2006.01)

(52) U.S. Cl.
CPC ..... *A61H 39/04* (2013.01); *A61H 2201/1695* (2013.01); *A61H 2205/04* (2013.01)

(58) Field of Classification Search
CPC ................ A61H 39/04; A61H 2205/04; A61H 2205/027; A61H 2205/067; A61H 2201/1695
See application file for complete search history.

(56) References Cited

U.S. PATENT DOCUMENTS 4,319,574 A * 3/1982 Sun ........................ A61H 39/04 63/12
4,832,006 A 5/1989 Kirsch
D982,769 S 4/2023 Koth
2006/0142678 A1* 6/2006 Hecht .................... A61H 39/04 601/134

OTHER PUBLICATIONS

International Search Report and Written Opinion received for PCT Patent Application No. PCT/US2023/065772, mailed on Oct. 13, 2023, 9 pages.

Printed from https://www.amazon.com/Stretcher-Shoulder-Alignment-Corrector-Chiropractic/dp/B08V959SX1/ref=asc_df_B08V959SX1/?tag=hyprod-20&linkCode=df0&hvadid=508210183331&hvpos=&hvnetw=g&hvrand=16558174964934249491&hvpone=&hvptwo=&hvqmt=&hvdev=c&hvdvcmdl=&hvlocint=&hvlocphy=9031952&hvtargid=pla-1296466426747&psc=1 on Sep. 26, 2023, 12 pages.

* cited by examiner

*Primary Examiner* — Vi X Nguyen
(74) *Attorney, Agent, or Firm* — ArentFox Schiff LLP

(57) ABSTRACT

Device and method for relieving muscle tension. The device includes three pairs of tips. Each pair is located, relative to the other two pairs of tips, at a vertex in a triangular orientation. Each pair of tips includes a unique horizontal distance in between the tips. Each tip is equidistant in height relative to its respective counterpart tip. The device also includes a connector configured to connect each tip to its counterpart tip. The connector is situated such that there is a pre-determined height differential between the apex of each pair of tips and the top of the connector. The apex of each pair of tips is vertically longer than the height of the connector.

13 Claims, 13 Drawing Sheets

(Prior Art)

PRESSURE RELEASE AND MASSAGE TOOL

CROSS-REFERENCE TO RELATED APPLICATIONS

The present application is a continuation of U.S. patent application Ser. No. 18/300,772 (KOTHP002), titled "PRESSURE RELEASE AND MASSAGE TOOL," filed Apr. 14, 2023, which claims the benefit of priority under 35 U.S.C. § 119(e) to U.S. Provisional Application No. 63/363,085 (KOTHP002P), titled "PRESSURE RELEASE AND MASSAGE TOOL," filed Apr. 15, 2022, both of which are incorporated in its entirety by this reference for all purposes.

TECHNICAL FIELD

Aspects of the present disclosure relate generally to massage or physical therapy devices, and more particularly apparatuses and methods for trigger point release of muscle groups.

BACKGROUND

Muscles directly relate to the function of body parts. Therefore, tension in the muscles significantly contributes to dysfunction or pain in any areas correlated with the muscles. For example, tightness and excess tension in the iliacus muscle are directly related to the function of the psoas, hip, lower back, pelvis, and leg. By releasing the tension in muscles, such as the iliacus muscle, correlated body parts, such as the hips, can function better and pain can be resolved.

Because muscles can sometimes be hard to access, pain and discomfort have traditionally been addressed by only a handful of skilled practitioners, who use their fingers to put prolonged pressure on the affected muscles to get the muscles to relax. Because of the difficulty in accessing these muscles independently without a practitioner, and the inability for a person to apply sufficient pressure on these muscles independently, it is very difficult for an individual to accomplish relief in these areas without the help of another person. People have tried to use many different kinds of objects in attempts to relieve pain and discomfort in affected muscles with only mediocre effectiveness. Thus, there is a need for an effective way to provide self-applied relief of muscle pain and discomfort.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

Aspects of the present disclosure relate to a neck massager or selective pressure application device. The neck massager or device includes three pairs of tips. Each pair is located, relative to the other two pairs of tips, at a vertex in a triangular orientation. Each pair of tips includes a unique horizontal distance in between the tips in each pair of tips. Each tip in the pairs of tips is equidistant in height relative to its respective counterpart tip. The neck massager or device includes a connector configured to connect each tip to its counterpart tip in each pair of tips. The connector is situated such that there is a pre-determined height differential between the apex of each pair of tips and the top of the connector. The apex of each pair of tips is vertically longer than the height of the connector.

In some embodiments, each pair of tips comprises different shapes from the other two pairs of tips. In some embodiments, each tip in the pair of tips is a mirror image of its respective counterpart tip. In some embodiments, the connector is configured to connect at least two pairs of tips. In some embodiments, each pair of tips is oriented at a different angle relative to a perpendicular line from the ground when the other two pairs of tips are touching the ground in a resting state. In some embodiments, the shape of each tip includes a section of the tip that has the same slope for two different points in the section. In some embodiments, each tip comprises material with a lower durometer value than the material that comprises the remainder of the device.

Another aspect of the disclosure relates to a method of using a selective pressure application device to relieve muscle tension. The method comprises positioning the selective pressure application device on a surface or ground and then leaning on the selective pressure application device such that a muscle or muscle group can attain trigger point release. The device includes three pairs of tips. Each pair is located, relative to the other two pairs of tips, at a vertex in a triangular orientation. Each pair of tips includes a unique horizontal distance in between the tips in each pair of tips. Each tip in the pairs of tips is equidistant in height relative to its respective counterpart tip. The neck massager or device includes a connector configured to connect each tip to its counterpart tip in each pair of tips. The connector is situated such that there is a pre-determined height differential between the apex of each pair of tips and the top of the connector. The apex of each pair of tips is vertically longer than the height of the connector.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The disclosure may best be understood by reference to the following description taken in conjunction with the accompanying drawings, which illustrate particular embodiments of the present disclosure. In the description that follows, like parts are marked throughout the specification and drawings with the same numerals, respectively. The drawing figures are not necessarily drawn to scale and certain figures may be shown in exaggerated or generalized form in the interest of clarity and conciseness.

DETAILED DESCRIPTION

Reference will now be made in detail to some specific examples of the present disclosure including the best modes contemplated for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, the techniques of the present disclosure will be described in the context of particular interlocking parts or physical compositions. However, it should be noted that the techniques of the present disclosure apply to various other parts or compositions. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

As used herein, the term "tip" will be used interchangeably with "pointed geometry." As used herein, the term "tool" will be used interchangeably with "device." As used herein, the term "massage," is used interchangeably with "trigger point release."

Various techniques and mechanisms of the present disclosure will sometimes be described in singular form for clarity. However, it should be noted that some embodiments include multiple iterations of a technique or multiple instantiations of a mechanism unless noted otherwise. For example, a device has a tip in a variety of contexts. However, it will be appreciated that a device can have multiple different tips while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a tip may be connected to a base, but it will be appreciated that a variety of extension portions, arms, connectors, bridges, and other features or elements may reside between the tip and the base. Consequently, a connection does not necessarily mean a direct, unimpeded connection unless otherwise noted.

Figures 1A, 1B:
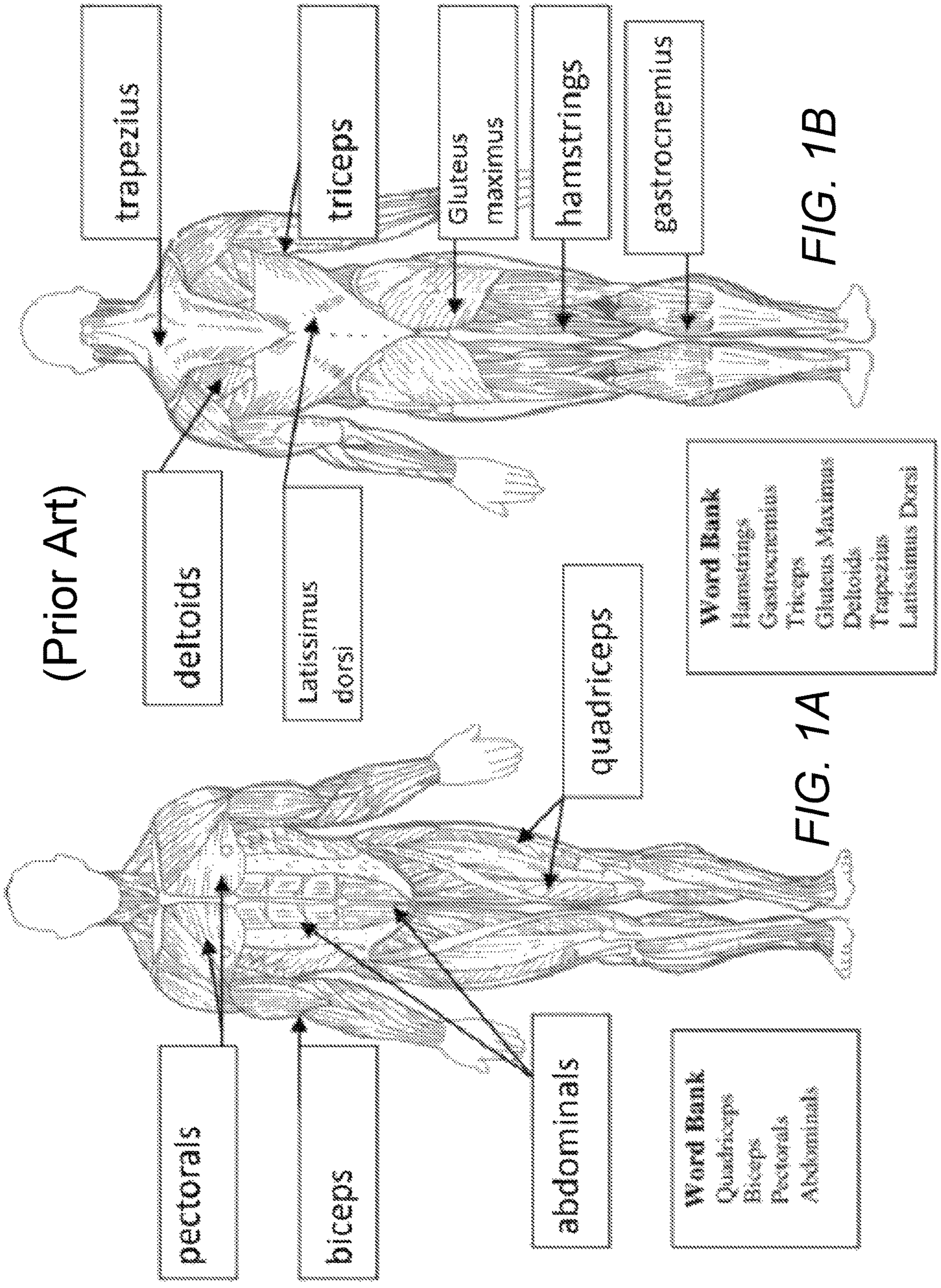
FIGS. 1A-1B show front and back illustrations of an example muscular system, in accordance with embodiments of the present disclosure.

Aspects of the disclosure relate to a massage device usable to stimulate or apply compression to, for example, a portion of muscles or muscle groups. FIGS. 1A-1B show front and back illustrations of a simplified muscular system, in accordance with embodiments of the present disclosure. FIGS. 1A-1B simply show some example muscle groups that can be affected by pressure, pain, and/or discomfort, to which techniques and devices disclosed herein aim to alleviate. For example, the techniques and devices disclosed herein can be used to alleviate pressure or pain in the gluteus maximus, pectorals, quadriceps, and hamstrings. The images in FIGS. 1A-1B are common knowledge, are provided for reference purposes only, and can be found on the Internet, for example at:

https://www.cabarrus.k12.nc.us/site/handlers/filedownload.ashx?moduleinstanceid=68833&dataid=265555&FileName=Muscles% 20-% 20Workbook.pdf.

One example muscle, or muscle group, which often suffers from tightness is the suboccipital muscles, aka the neck muscles. There are multiple small muscles like the obliquus capitis superior, obliquus capitis inferior, rectus capitis posterior major and rectus capitis posterior minor that make up the suboccipital muscle group. These muscles originate at the occiput of the skull and insert on the cervical vertebrae. The motion of the head on the neck is controlled by these muscles. Tightness in the suboccipital muscle group not only affects the range of motion of the head and neck, but can cause neck pain, headaches, and poor posture. Tightness here also impacts the health of the nervous system as a whole given its close proximity to the brain and spinal cord.

As with many muscles, the suboccipital muscles may tighten or shorten due to various external and/or internal factors. As with many muscles, massaging and/or providing localized pressure to or "releasing" the suboccipital muscle may help to relax or loosen the muscle and/or reduce pain associated with tightness and/or shortening of the muscle. However, because the suboccipital muscles arise from an angled crevice between the skull and the cervical vertebrae, and the muscles themselves are so small, portions of the muscle may be difficult to access by a therapist and/or physician. Further, the affected individual may wish to be able to compress and/or massage their own suboccipital muscle(s) without the need for assistance from others. In addition, there are benefits from compression of the muscles while providing traction of the neck which is, again, difficult to do without assistance from others.

Many people have tension in their neck muscles, and that tension can result in a lack of range of motion as well as pain, headaches, difficulty maintaining good posture, and all sorts of physical ailments. Thus, there is a need for a tool that can solve that muscle tension by being able to target the specific muscles that are tight and help them relax through the mechanism of prolonged pressure. With today's technology, there are many different ways that people try to address this, e.g., with a tennis ball or with their own hands, but the difficulty is that all the other methods that are out there are not able to pinpoint specific muscles, either because they are too general or they do not apply sufficient direct pressure to the affected areas. In addition, it may be difficult to isolate the neck muscles because the neck muscles are actually quite small. Thus, there is a need for a massage device to target the neck muscles in an effective manner.

With the aforementioned goals in mind, aspects of the disclosure relate to a massage device usable to provide localized pressure to any muscle group. FIGS. 2A-2I illustrate one example of a device that can alleviate pressure or pain in a muscle group, in accordance with embodiments of the present disclosure. Example aspects of the massage device in accordance with aspects of the present disclosure are described throughout the specification. In the interest of clarity, not all possible features of an actual implementation are described in this specification. It will of course be appreciated that in the development of any such actual implementation, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Figure 2A:
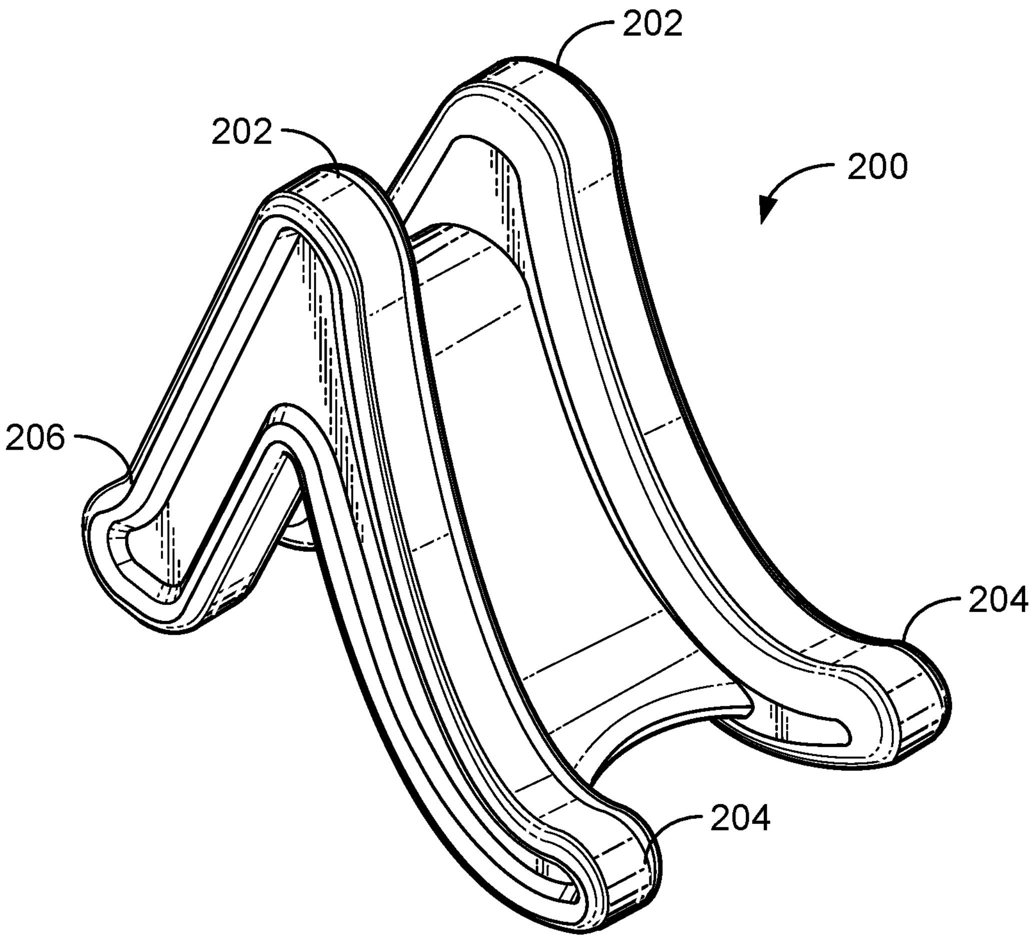
FIGS. 2A-2I illustrate one exemplary embodiment of a massage device, in accordance with embodiments of the present disclosure.

FIGS. 2A-2I illustrate a detailed example of an exemplary embodiment of a massage tool/device in accordance with the present disclosure. FIG. 2A illustrates a three dimensional perspective view of an example massage device 200, showing front, left, and top perspective views. Device 200 includes three pairs of pointed geometries 202, 204, and 206. In some embodiments, each pair of tips is designed to be at the right distance apart to target different muscles in the neck. The right distance is based on anatomy of the pairs of suboccipital muscles and where the muscles are located in relation to the center of the spine. In some embodiments, the closest pair together is pair of tips 206. In some embodiments, pair of tips 206 is designed to target the muscle group rectus capitis posterior minor. In some embodiments, the tips in pair of tips 206 is 1 inch apart, which is generally the distance between the aforementioned muscle group for the average human. In some embodiments, the second widest pair is 202. Pair 202 targets rectus capitis posterior major. In some embodiments, the distance between the tips in pair 202 is 1.5 inches. In some embodiments, the widest distance is between pair 204, which targets obliquus capitis superior. In some embodiments, the distance between tips in pair 204 is 2.5 inches. All three muscle groups mentioned above connect the head to the neck/cervical spine. They are responsible for nodding the head and are 75-80% responsible for rotation motion of the head and neck.

According to various embodiments, each pair of tips is designed with a distinctive shape, specifically designed. Many of existing solutions include spherical tips. That is the standard way of tip design in the current art. However, spherical tips are not as effective because the force gets distributed over a sphere. For spherical tips, the pressure gets distributed at its apex, and the force dampens with more pressure as the sphere deforms. Thus, to solve this issue, in some embodiments, the tips are designed to have a nearly flat surface, either with a slight slope or completely flat.

In some embodiments, each pointed geometry is a different shape or oriented at a different angle. In some embodiments, pointed geometries are curved/bent in order to increase the angle of the application of the force. In some embodiments, the concave curvature of each side of the pointed geometry allows for maximum clearance for surrounding body tissue that may fold around each pointed geometry during engagement of the pointed geometries 202, 204, and 206 with the target muscle group. FIG. 2C illustrates an example of a tip that is completely flat or nearly flat at the top of the tip. Thus, in some embodiments, there is a platform or flat surface at the top of each tip. The platform forms a plateau that creates a wide surface for providing pressure on the muscle. Having a cross section or a surface that is flat while contacting the body provides the ability to generate force over a wider area, which is more therapeutic than a sphere.

According to various embodiments, the size of each tip is specifically designed to match the size of each targeted muscle group. A small muscle needs a smaller tip because you need to isolate each muscle. For example, a small tip size can range anywhere from 0.5-0.75 inches wide along the x-axis for each tip. In some embodiments, the width and height of the flat part of the tip can range from 0.5-1 inches wide along the y-axis. In addition, the tip also has rounded edges at a pretty large radius in order to prevent injury from sharp corners. In some embodiments, at the very top of a tip, if viewing from above, the tip looks similar to a rhomboid, as shown in FIG. 2D. It is the rectangular or rhomboid shape of the tip that makes the dimensions very important.

Figure 2B:
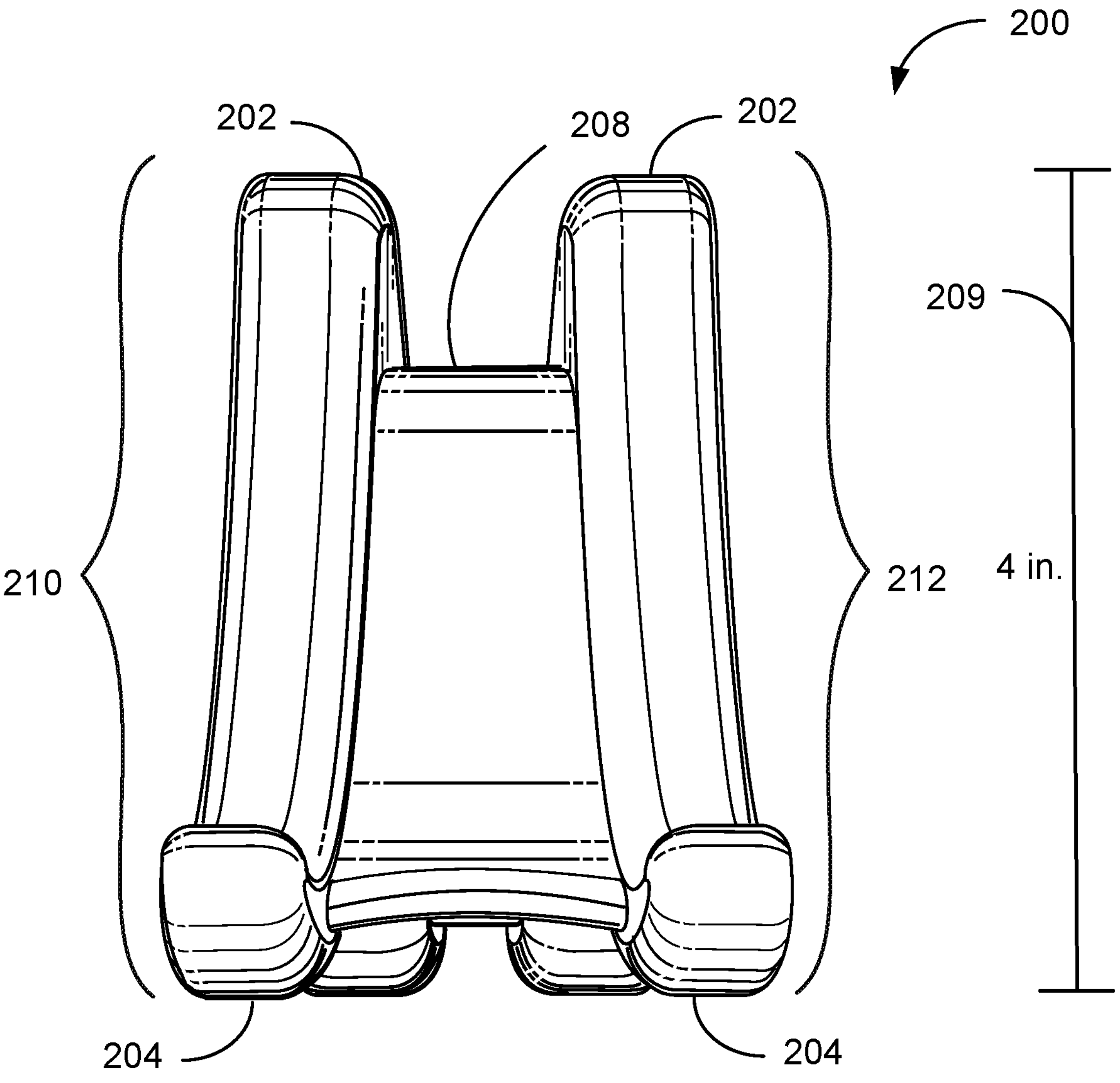
Figure 2C:
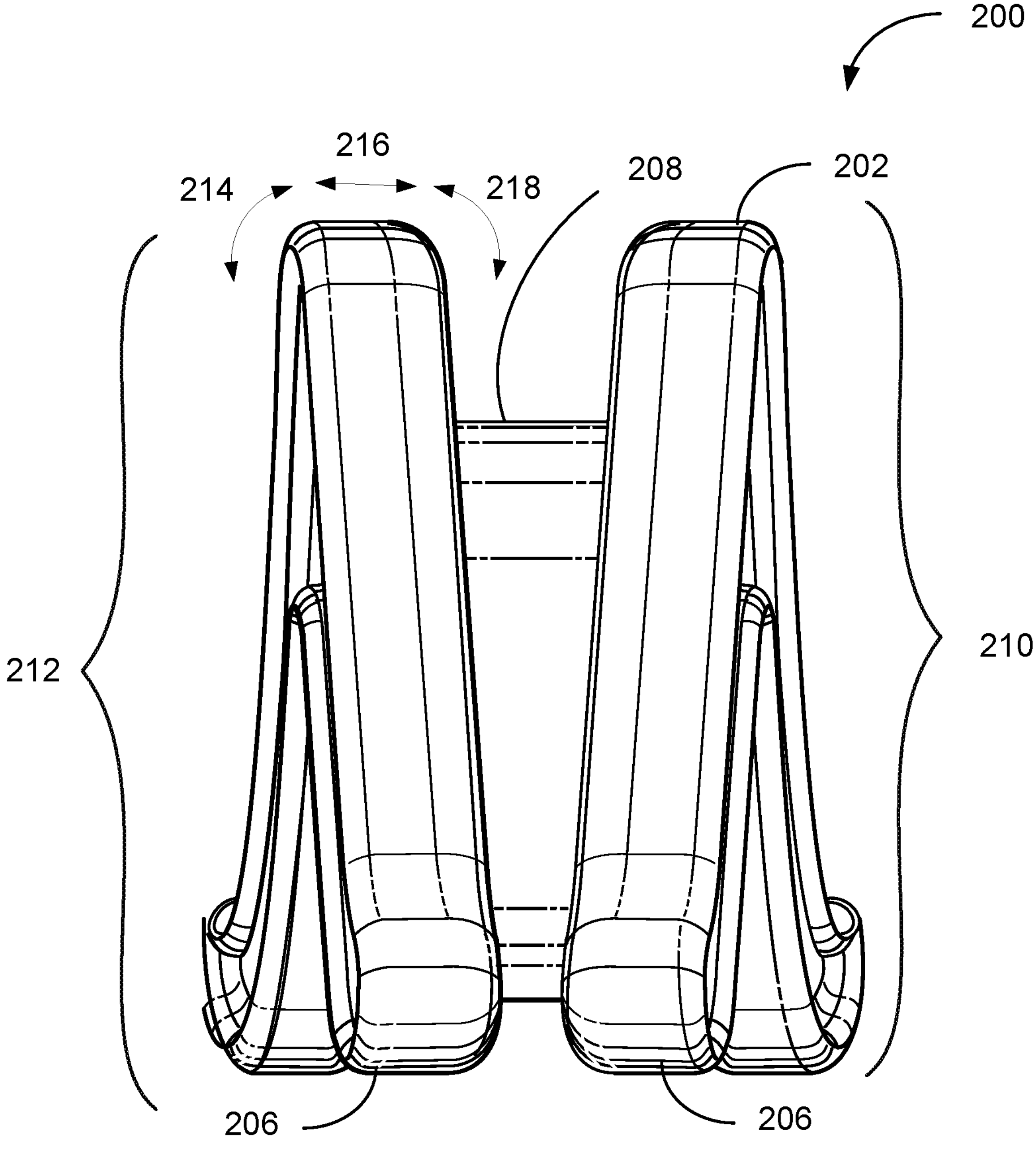
Figure 2D:
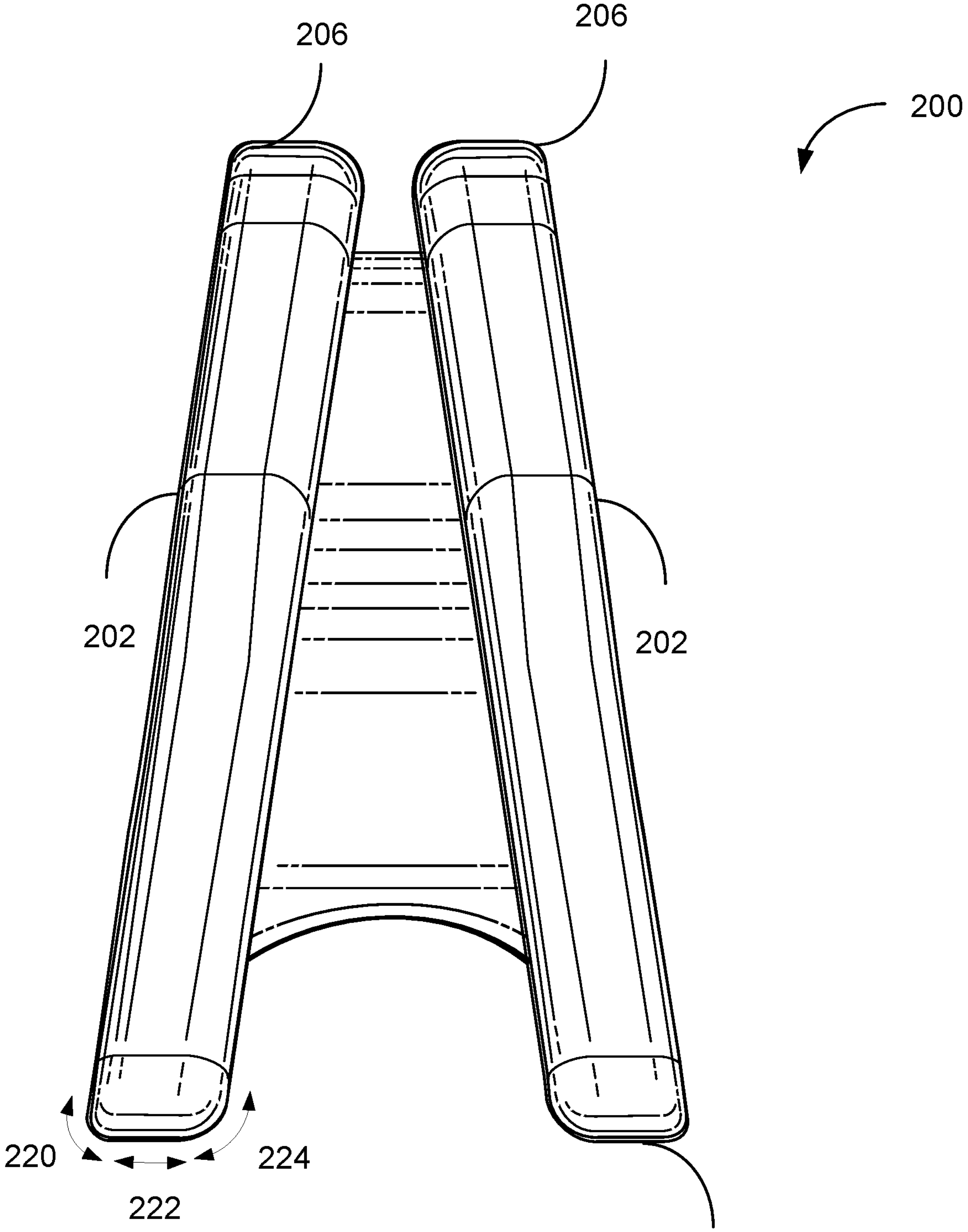

FIG. 2B presents a front side view of device 200. In some embodiments, device 200 comprises two halves, a left half 210 and a right half 212, connected together by a connector 208. In such embodiments, each half of device 200 includes a tip 202, 204, and 206, connected altogether in a triangular arrangement. As shown in the figures, such as FIG. 2A and FIG. 2F, while tips 202, 204, and 206 are arranged in a triangular arrangement, in some embodiments, each half of device 200 does not need to form an actual triangle. In the example embodiment shown in the figures, each half of device 200 can take a shape resembling the Greek alphabet letter “lambda.”

In some embodiments, connector 208 is a singular connector that connects both halves of device 200. In other embodiments, connector 208 is actually multiple different connectors/sub-connectors that connect only one pair of tips. In such embodiments, connector 208 is actually two or three different sub-connectors, with each sub-connector connecting only one or two pairs of tips each. In other embodiments, connector 208 can be a single bar in the center connecting the two halves together. In some embodiments, connector 208 connects the two halves together but leaves a space in between in order to leave space for the spinous process during usage. In some embodiments, the depth of the space is at least 0.25 inches.

Figure 2G:
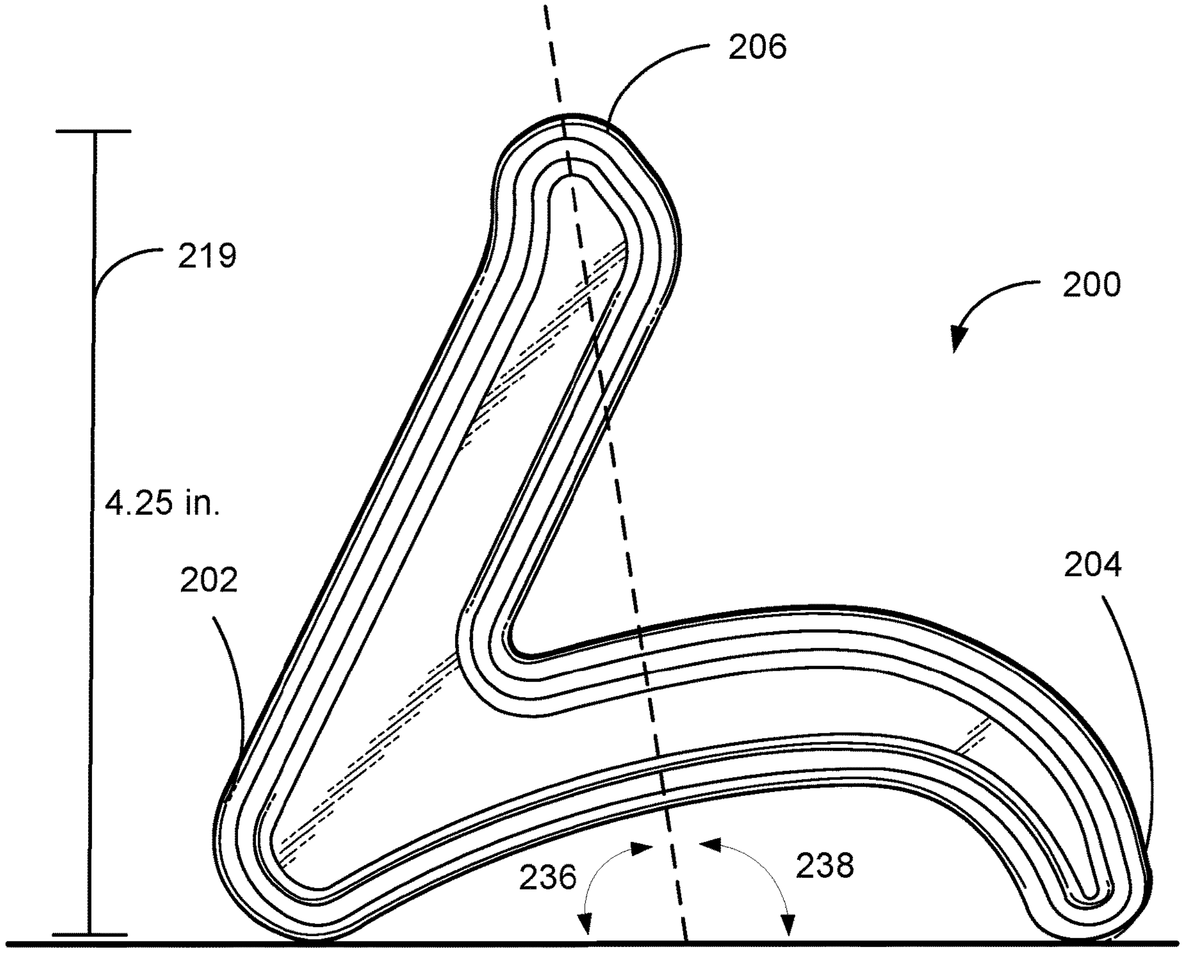
Figure 2H:
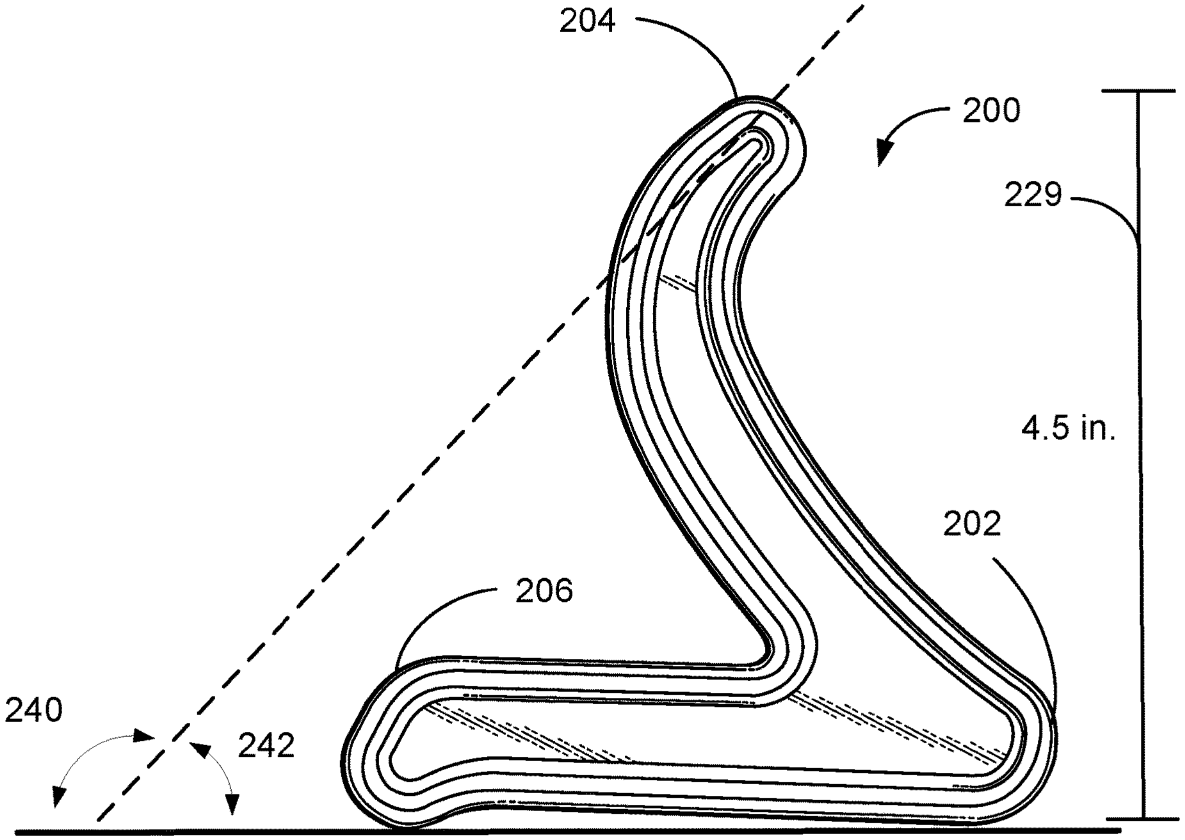
Figure 3A:
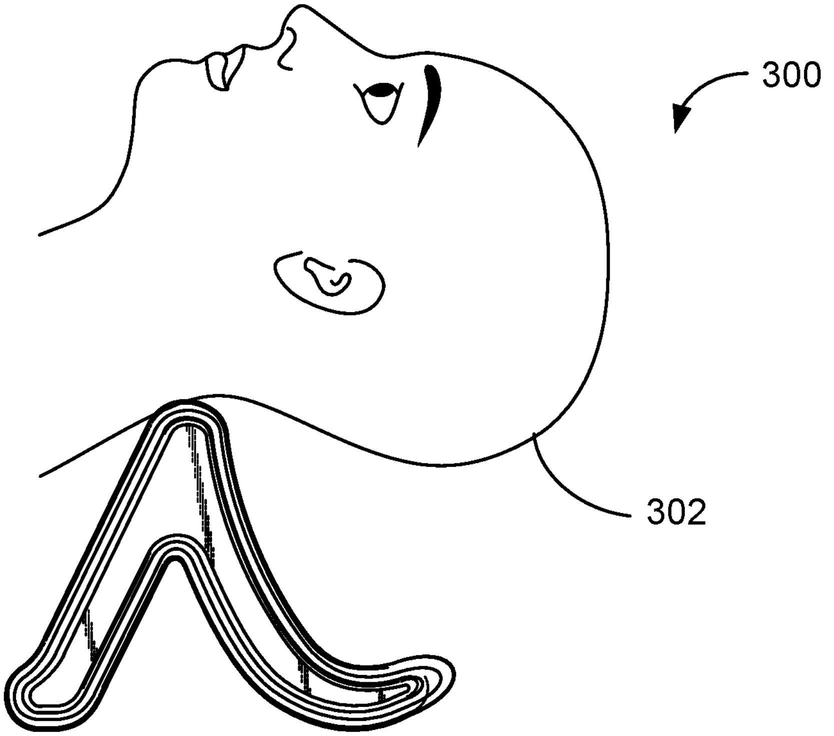
FIGS. 3A-3D illustrate different orientations for using a massage device, in accordance with one or more embodiments of the present disclosure.
Figure 3B:
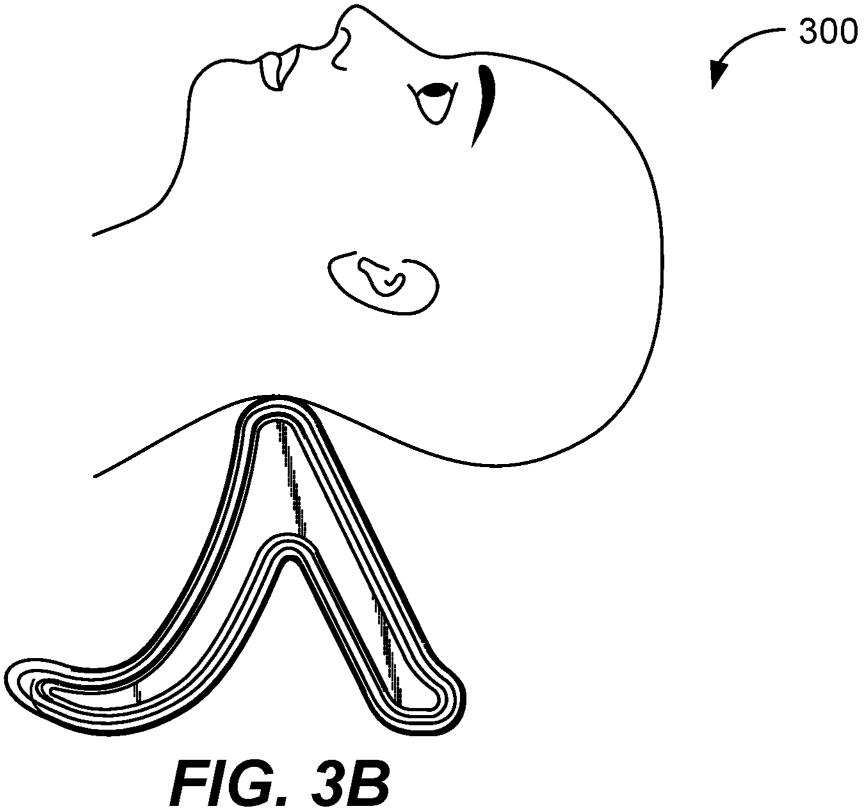
Figure 3C:
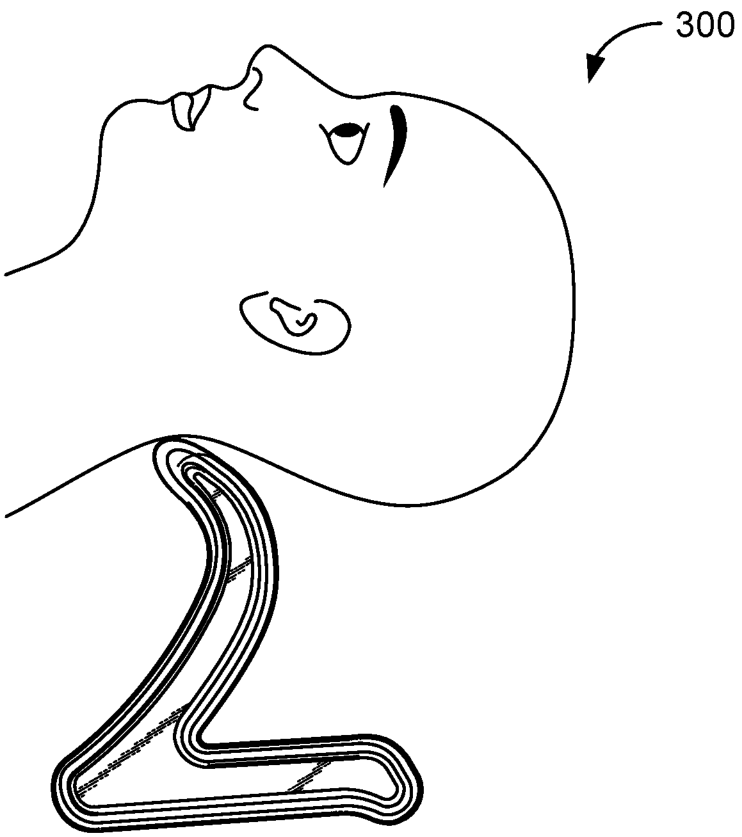
Figure 3D:
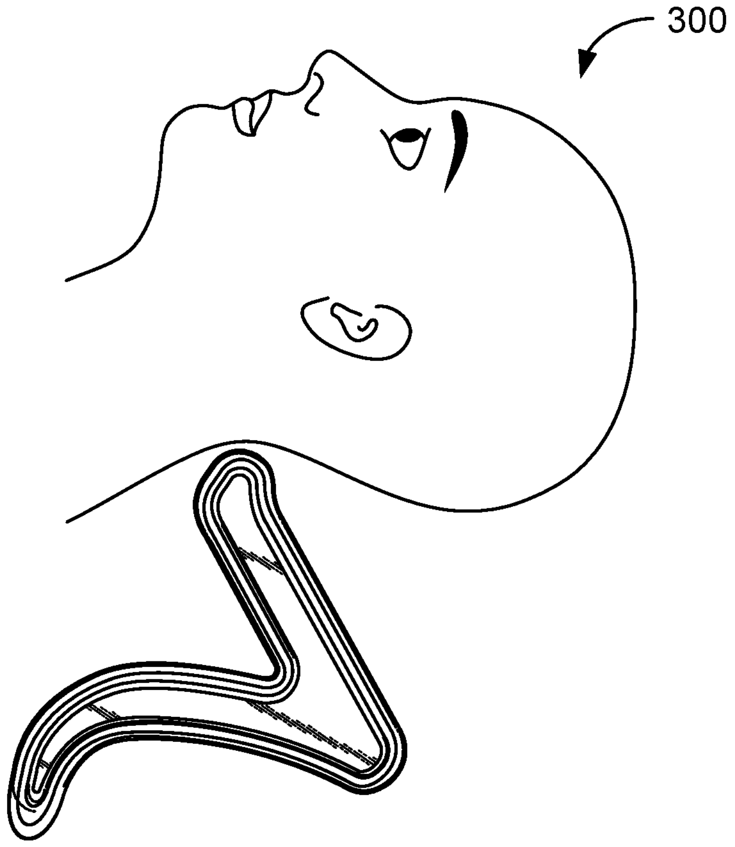

In some embodiments, the triangular arrangement of the three pairs of tips is configured such that rotation of device 200 allows for different pairs of tips to hit different muscle groups at various angles, while the other two pairs of tips provide stable support for device 200. Having the tips be different angles introduces an intentional asymmetry to the design. The intentional asymmetry introduced into the three different pairs of tips creates multiple angles of pressure depending on the orientation. Each pair of tips can be oriented in two different ways, as illustrated in FIGS. 3A and 3B. Thus, with three pairs of tips, a user can potentially use six different angles for applying pressure. In some embodiments, the height from the ground to the tips that are pointing up in the air is very important. The height needs to be high enough from the ground such that the head and neck are elevated from the ground during use. However, if the height is too high, the neck may be out of alignment. Further, if the height is too low, there is not enough pressure because the head may be on the ground. As shown in FIG. 2B, an example height 209 from the ground to the top of tip 202 is 4 inches. In some embodiments, the heights of the tips at various orientations differ slightly for maximum effectiveness. For example, height 219 is 4.25 inches, as shown in FIG. 2G, and height 229 is 4.5 inches, as shown in FIG. 2H. The orientation of device 200 plays a large role in its usage, as described in further detail below with regard to FIGS. 3A-3D. The heights given above are ideal heights derived empirically. However, in some embodiments, effective heights can fall within a height range. In some embodiments, the range for height 209 can vary from about 3 inches at its lowest to 5 inches at its highest. In other words, a 2 inch swing in the range is acceptable for many embodiments. Thus, in some embodiments, height 219 can range from 3.25 to 5.25 inches, and height 229 can range from 3.5 to 5.5 inches. As mentioned above, the heights just need to be designed such that the tips apply pressure to muscles in the neck at an elevated position but not too elevated such that the neck is out of position.

FIG. 2C presents a back side view of device 200. FIG. 2C also shows example dimensions for tips 202 along a vertical slice from the left side to the right side of device 200. For example, tip 202 comprises two different radii of curvature along the sides of the tip, with a flat portion 216 in the middle. A first radius of curvature 214 governs the outside curvature of tip 202 in connection with flat portion 216. In some embodiments, an ideal radius of 3.1 mm can be used to round out the outer edge of tip 202. In some embodiments, radius of curvature 218 can have an ideal radius of 6.2 mm to round out the inside edge of tip 202. In some embodiments, the difference in radius between radius 214 and 218 is due to the fact that the inside edge may come into contact with inner parts of the user's neck (parts that are in between the two tips in a pair of tips). Thus, a more gradual edge curvature may provide more comfort for other parts of the neck during usage.

FIG. 2D presents a top view of device 200. FIG. 2D also shows example dimensions for tips 204 along a horizontal slice from the left side to the right side of device 200. For example, tip 204 comprises two different radii of curvature along the sides of the tip, with a flat portion 222 in the middle. As with tip 202, a first radius of curvature 220 governs the outside curvature of tip 204 in connection with flat portion 222. In some embodiments, an ideal radius of 3.1 mm can be used to round out the outer edge of tip 204. In some embodiments, radius of curvature 224 can have an ideal radius of 6.2 mm to round out the inside edge of tip 204. In some embodiments, the difference in radius between radius 220 and 224 is due to the fact that the inside edge may come into contact with inner parts of the user's neck. Thus, a more gradual edge curvature may provide more comfort for other parts of the neck during usage.

Figure 2E:
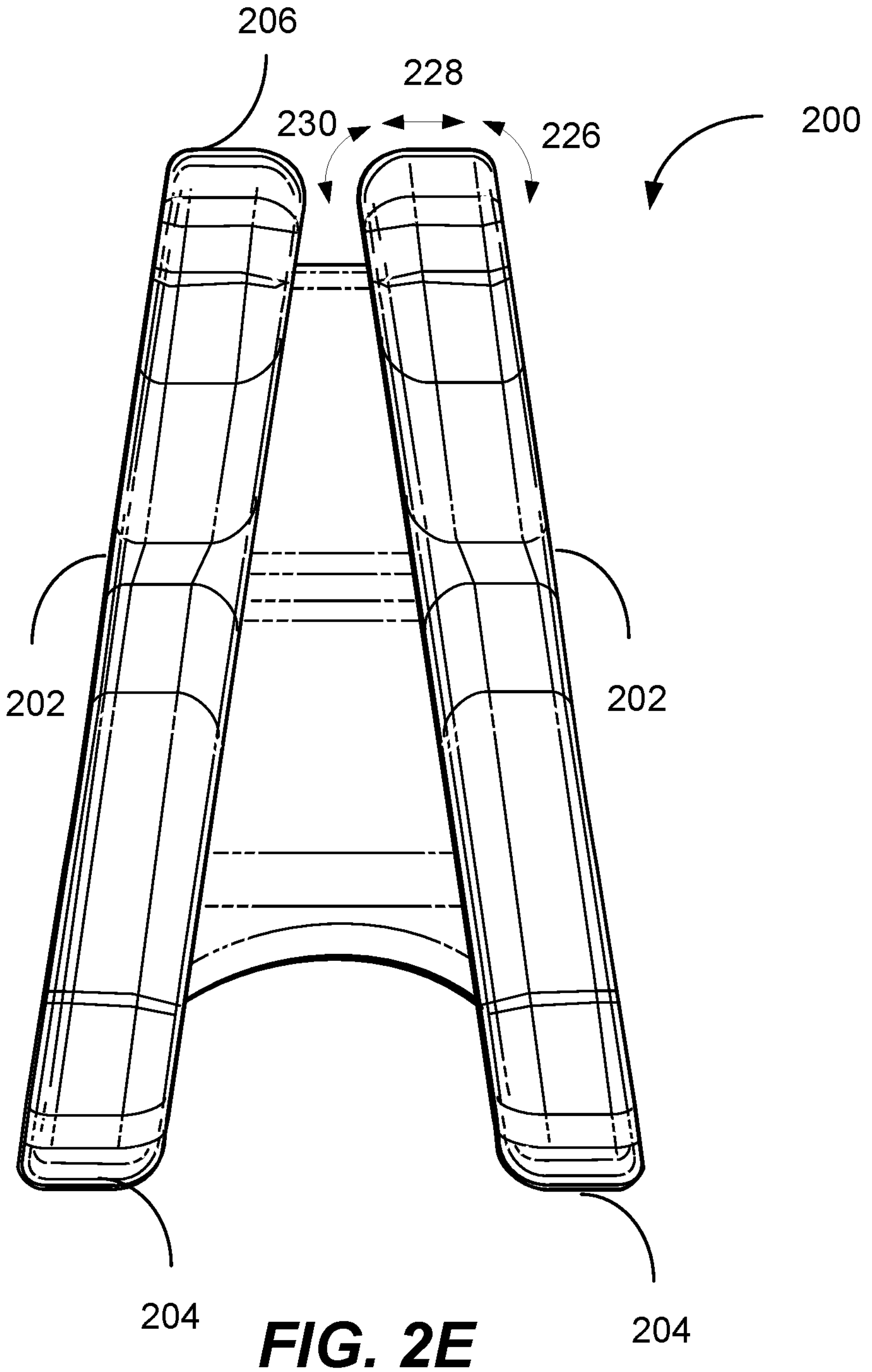

FIG. 2E presents a bottom view of device 200. FIG. 2E also shows example dimensions for tips 206 along a horizontal slice from the left side to the right side of device 200. For example, tip 206 comprises two different radii of curvature along the sides of the tip, with a flat portion 228 in the middle. As with tips 202 and 204, a first radius of curvature 226 governs the outside curvature of tip 206 in connection with flat portion 228. In some embodiments, an ideal radius of 3.1 mm can be used to round out the outer edge of tip 206. In some embodiments, radius of curvature 230 can have an ideal radius of 6.2 mm to round out the inside edge of tip 206. In some embodiments, the difference in radius between radius 226 and 230 is due to the fact that the inside edge may come into contact with inner parts of the user's neck. Thus, a rounder edge may provide more comfort for other parts of the neck during usage.

Figure 2F:
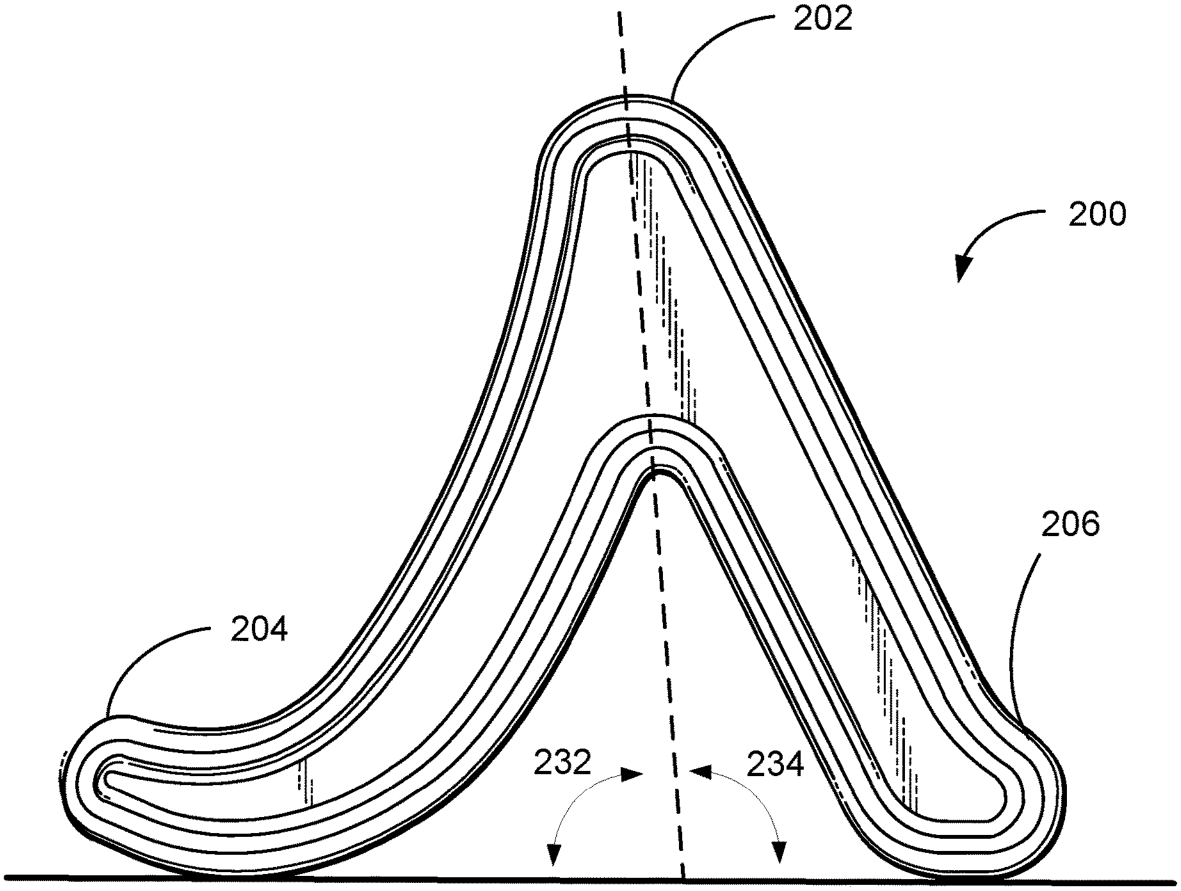

FIG. 2F presents a right side view of device 200, with tips 202 pointing in the air. FIG. 2F also shows example dimensions for device 200. For example, FIG. 2F shows an example angle for tip 202 when tips 204 and 206 are touching the ground. An example angle 232 can have a value of 87.3 degrees, which means that complement angle 234 can be 92.7 degrees.

FIG. 2G presents a right side view of device 200, but with tips 206 pointing in the air. FIG. 2G also shows example dimensions for device 200. For example, FIG. 2G shows an example angle for tip 206 when tips 202 and 204 are touching the ground. An example angle 236 can have a value of 79.1 degrees, which means that complement angle 238 can be 100.9 degrees.

FIG. 2H presents a right side view of device 200, but with tips 204 pointing in the air. FIG. 2H also shows example dimensions for device 200. For example, FIG. 2H shows an example angle for tip 204 when tips 202 and 206 are touching the ground. An example angle 240 can have a value of 137.5 degrees, which means that complement angle 242 can be 42.5 degrees.

Figure 2I:
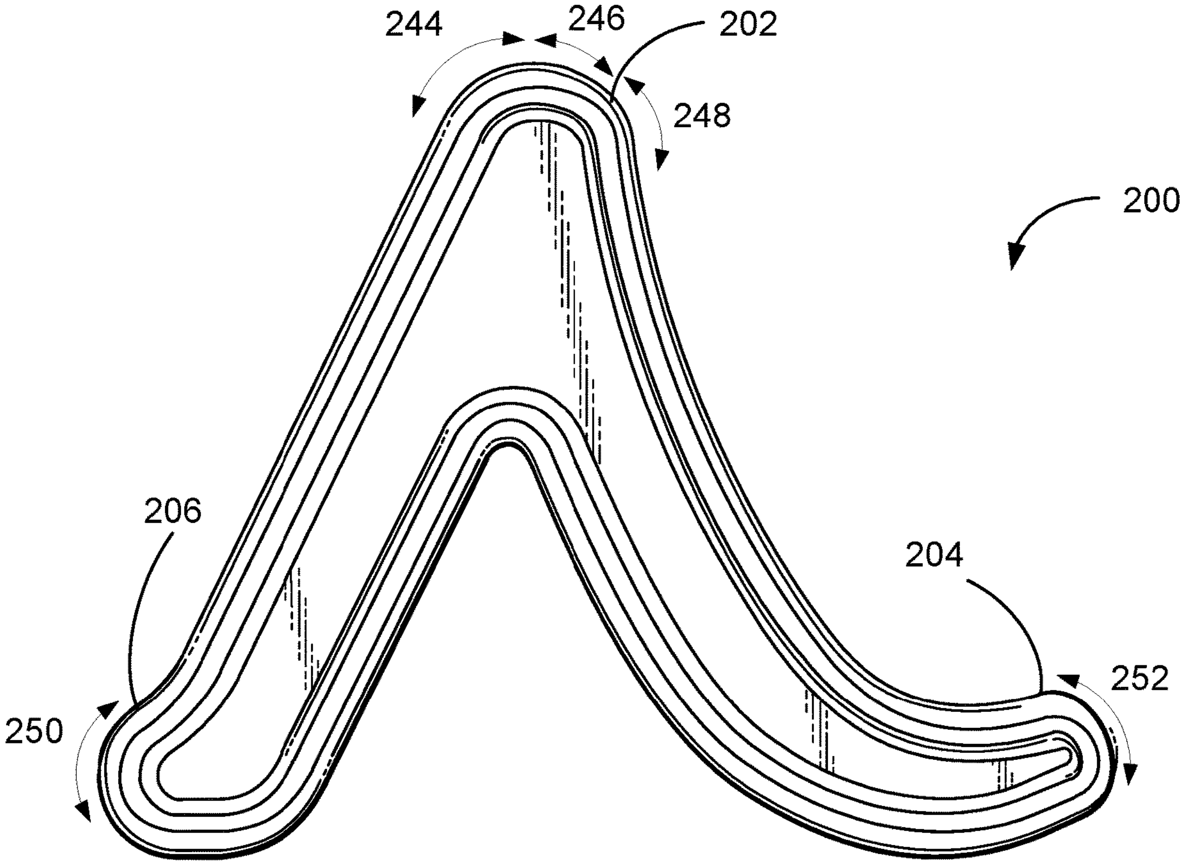

FIG. 2I presents a left side view of device 200, with tips 202 pointing in the air. FIG. 2I also shows example dimensions for device 200. For example, FIG. 2I shows example dimensions for tips 202, 204, and 206 along a vertical slice from the front to the back of device 200. For example, tip 202 comprises three different radii of curvature along the sides of the tip in this view. A first radius of curvature 244 governs the left side curvature of tip 202 in this view, while a second radius of curvature 246 governs the middle of tip 202, and a third radius of curvature 248 governs the right side curvature of tip 202. In some embodiments, radius 244 can have an ideal radius of 11.5 mm. In some embodiments, radius 246 can have an ideal radius of 13.4 mm. In some embodiments, radius 248 can have an ideal radius of 10.3 mm. In some embodiments, tip 206 may have a radius of curvature 250, which in some embodiments, has an ideal radius of 10.1 mm. In some embodiments, tip 204 may have a radius of curvature 252, which in some embodiments, has an ideal radius of 8.1 mm.

The numbers presented above are just examples of numbers according to certain embodiments. Any "ideal" number presented herein was derived empirically through much experimentation in order to precisely design the most effective and efficient pressure release tool for targeting the multiple small muscles in the neck, such as the obliquus capitis superior, obliquus capitis inferior, rectus capitis posterior major and rectus capitis posterior minor that make up the suboccipital muscle group.

While massage device 200 is designed for use with all muscle groups and body parts, a different embodiment may be better suited for certain specific muscle groups and body parts, such as the neck muscles. There are many muscles in the neck, some on the anterior, lateral, and posterior surfaces. Each one of these small muscles can become tight and it takes a precise angle and tip size to target each of those muscles individually for maximum results. For compression therapy, some muscles, like the longus capitis are best accessed from the lateral neck, whereas others, like the transverospinalis group, are best accessed from the posterior neck. In order to massage or provide compression to each of these muscles individually, a specific location and angle of pressure are needed. For example, one muscle may best benefit from a combination of anterior and lateral pressure from a location of 1 cm from the spinous process where another muscle would benefit from medial pressure only from a distance of 9 cm from the spinous process. Because of the irregular angular nature of the shape of the vertebrae and the varied attachment points and direction of the muscles, in order to access each and every one of these muscles independent of a practitioner, one needs a tool that can not only target each muscle on its own, but can also provide a variety of combinations of angles of pressure. The following embodiments can effectively target each of these muscles with its ability to pivot in different planes, thereby providing pressure in a wide variety of angles.

FIGS. 3A-3D illustrate configurations for using a massage device, in accordance with one or more embodiments of the present disclosure. FIG. 3A shows usage of device 300 in one configuration. In some embodiments, the user can rotate the tool depending on how close the user wants the tips to be placed in proximity of the spine. As shown in FIGS. 3A-3D, a user 302 can lay on the ground and a pair of tips that are pointing up can make contact with the base of the user's skull. From there, the user can rotate the tool around in order to have different pairs of tips facing up and used against the base of the user's skull. FIGS. 3A-3D all show usage of device 300 in various positions.

According to various embodiments, the device provides perpendicular pressure, or mostly perpendicular pressure depending on the angle of the tips, to affected areas. In many embodiments, each pair of tips provides a bit of an angle relative to the normal, which is perpendicular to the ground. Different angles of "perpendicular" pressure at certain distances away from the center of the spine can be chosen to target specific muscle groups.

According to various embodiments, the smallest distance between a pair of tips is demonstrated in FIG. 2C, which shows pointed geometries 206. According to various embodiments, pointed geometries 204 are set at the widest distance apart, and pointed geometries 202 have a distance apart that is somewhere in the middle.

In some embodiments, each device has two tips equidistant from the center. This design gives a space for the spinous process when a user lies on the device. The pressure is initially evenly distributed between the two points, equidistant from the center of the spine, so the device is pushing on the muscles on either side of the spine at the same time. This is helpful for several reasons. The design allows the user to get into a position that is comfortable where the force is evenly distributed, i.e., the user does not put all of the user's weight onto one point. This is also helpful because many people tend to have tender and sensitive necks, which results in discomfort when a lot of pressure is applied to a single spot.

In some embodiments, when a user is lying on the device, the user can lean one way or the other to put more pressure on the side if the user wants to focus on a certain area, thereby giving the user more control. In some embodiments, the device can actually be a base with two tips sticking up in the air, as long as there are two tips. This is an improvement over devices that utilize spherical tips, e.g., two racquetballs stuck together, because with a spherical tip, pressure is only applied over the apex of the tip and not over the entire tip. By contrast, according to some embodiments, the tip on the device includes a flat portion, which allows the tip to pin the muscle and provide even pressure along that entire muscle. In some embodiments, a tip of the device may be completely flat, or almost completely flat, in one direction, but not completely flat in another direction. In some embodiments, the tip needs to be close to flat in order to pin the muscle. However, in some embodiments, the tip cannot be too wide, otherwise the tip would hit more than one muscle at a time, which is not ideal because the muscles are small. It is very important to hit only the correct muscles. If a tip of the device hits more than one muscle at a time during usage, the pressure exerted would be dispersed over multiple muscles, which may render the pressure release tool not as effective.

As mentioned above, the targeted muscles for device 300 are the suboccipital muscles. The suboccipital muscles connect a person's head to their neck. Some are close to the spine, some are further away. For example, in some embodiments, the space between two tips 206 is about 0.5 to 1 inches. Such a space allows the spinous process, a.k.a. the bony part that sticks out of the user's neck, a place to rest such that the tips can contact the muscles themselves without interference. This is one reason why devices 200 and 300 are designed with multiple pairs of tips at different distances. In some embodiments, the device can also be used to address tension in other muscle groups, e.g., the pec minor (a muscle in the chest that is responsible for rounding the shoulders forward) or the upper trapezius (a muscle responsible for shrugging the shoulders).

In some embodiments, the height of a tip of the device to the ground (i.e., the distance) needs to be within a range that would allow the head and neck of a user to rest on the device and apply enough pressure passively. In such embodiments, an acceptable range (acquired empirically) may be 2 to 5 inches. If the height is too high, the user's neck would be at an unnatural position (such as a "kinked" position). If the height is too low, then the user's head would hit the ground, which may reduce the pressure applied downwards on the device.

In some embodiments, the depth of the dip between the various pairs of tips also varies. The dip allows for the user's spinous process to have a place to rest. If the height of the connector is too high (meaning the depth of the dip is too shallow), the connector would push into the spine. Thus, in some embodiments, a minimum depth of at least 0.5 inches is necessary. In some embodiments, 1-2 inches is ideal for the dip depth.

In some embodiments, the tips need to be flat because the user needs to pin the muscles evenly. In some embodiments, the tips are about 0.5 inches around the flat part of the tip before it starts curving. In some embodiments, the distance between tips can vary from 0 or up to 3.5 inches (in most embodiments, 3.5 inches should be the maximum width). In some embodiments, the distance between tips can be 0.25 inches, 1 inch, or 2 inches wide.

According to various embodiments, the device comprises at least two different material compositions: one for an undermold and one for an overmold. The undermold is the underlying material that forms the bulk of the device. The overmold is a layer of material that is superimposed on top of the undermold in order to provide various different functions, such as grip and softening of pressure during direct contact. In some embodiments, the materials for the undermold of the device can be made of metal, wood, plastic, or any durable material. In some embodiments, the overmold can be rubber.

While the examples illustrated in all the figures above show particular combinations of features/elements of devices, it should be noted that any combination of parts, portions, features, or elements from any combination of the figures can also be mixed and matched to achieve an embodiment in accordance with the present disclosure. These examples are all designed with the function of being able to apply pressure to the muscle by either moving the tool into the body or moving the body on the tool.

The foregoing description of various aspects and examples has been presented for purposes of illustration and description. It is not intended to be exhaustive nor to limit the disclosure to the forms described. The aspects(s) illustrated in the figures can, in some instances, be understood to be shown to scale for illustrative purposes. Numerous modifications are possible in light of the above teachings, including a combination of the abovementioned aspects. Some of those modifications have been discussed and others will be understood by those skilled in the art. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

What is claimed is:

1. A selective pressure application device, comprising:

three pairs of tips, each pair located, relative to the other two pairs of tips, at a vertex in a triangular orientation, wherein each pair of tips includes a unique horizontal distance in between the tips in each pair of tips, and wherein each tip in the pairs of tips is equidistant in height relative to its respective counterpart tip; and a connector configured to connect each tip to its counterpart tip in each pair of tips, wherein the connector is situated such that there is a pre-determined height differential between the apex of each pair of tips and the top of the connector, the apex of each pair of tips being vertically longer than the height of the connector; wherein each pair of tips is oriented at a different angle relative to a perpendicular line from the ground when the other two pairs of tips are touching the ground in a resting state.

2. The device of claim 1, wherein each pair of tips comprises different shapes from the other two pairs of tips.

3. The device of claim 1, wherein each tip in the pair of tips is a mirror image of its respective counterpart tip.

4. The device of claim 1, wherein the connector is configured to connect at least two pairs of tips.

5. The device of claim 1, wherein the shape of each tip includes a section of the tip that has the same slope for two different points in the section.

6. The device of claim 1, wherein each tip comprises material with a lower durometer value than the material that comprises the remainder of the device.

7. A neck massager comprising: a massage tool;

three pairs of tips, each pair located, relative to the other two pairs of tips, at a vertex in a triangular orientation, wherein each pair of tips includes a unique horizontal distance in between the tips in each pair of tips, and wherein each tip in the pairs of tips is equidistant in height relative to its respective counterpart tip; and a connector configured to connect each tip to its counterpart tip in each pair of tips, wherein the connector is situated such that there is a pre-determined height differential between the apex of each pair of tips and the top of the connector, the apex of each pair of tips being vertically longer than the height of the connector; wherein each pair of tips is oriented at a different angle relative to a perpendicular line from the ground when the other two pairs of tips are touching the ground in a resting state.

8. The neck massager of claim 7, wherein each pair of tips comprises different shapes from the other two pairs of tips.

9. The neck massager of claim 7, wherein each tip in the pair of tips is a mirror image of its respective counterpart tip.

10. The neck massager of claim 7, wherein the connector is configured to connect at least two pairs of tips.

11. The neck massager of claim 7, wherein each pair of tips is oriented at a different angle relative to a perpendicular line from the ground when the other two pairs of tips are touching the ground in a resting state.

12. The neck massager of claim 7, wherein the shape of each tip includes a section of the tip that has the same slope for two different points in the section.

13. The neck massager of claim 7, wherein each tip comprises material with a lower durometer value than the material that comprises the remainder of the device.

* * * * *